United States Patent
Perrine

(10) Patent No.: US 6,418,834 B1
(45) Date of Patent: Jul. 16, 2002

(54) APPARATUS FOR TREATING AN ITEM DURING TRAVEL OF THE ITEM ALONG A TREATING TROUGH

(76) Inventor: Paul M. Perrine, P.O. Box 363, Aurora, IN (US) 47001

( * ) Notice: Subject to any disclaimer, the term of this patent is extended or adjusted under 35 U.S.C. 154(b) by 0 days.

(21) Appl. No.: 09/953,397

(22) Filed: Sep. 12, 2001

Related U.S. Application Data

(63) Continuation-in-part of application No. 09/360,755, filed on Jul. 26, 1999.

(51) Int. Cl.[7] .................... A23L 1/00; A47J 37/00; A21B 1/00; F24D 1/00; F24C 15/32
(52) U.S. Cl. .................... 99/334; 99/352; 99/360; 99/386; 99/443 C; 99/477; 99/479; 34/147; 34/225; 62/380; 62/381
(58) Field of Search .................... 99/327–335, 352–355, 99/443 C, 443 R, 386, 359–371, 477–479, 467, 468; 110/248; 126/21 A, 21 R; 62/380, 57, 381, 63, 91; 34/75, 78, 147, 225; 198/778, 883; 432/14, 15, 58, 72, 133, 134, 138; 426/474, 506, 520, 524, 467

(56) References Cited

U.S. PATENT DOCUMENTS

| | | | | |
|---|---|---|---|---|
| 2,011,247 A | * | 8/1935 | Jourdan | .................... 99/443 C |
| 3,293,768 A | | 12/1966 | Blank et al. | |
| 4,100,760 A | | 7/1978 | Cheney | |
| 4,177,642 A | | 12/1979 | Overbye | |
| 4,215,151 A | | 7/1980 | Rios et al. | |
| 4,255,459 A | | 3/1981 | Glen | |
| 4,322,447 A | | 3/1982 | Hubbard | |
| 4,565,282 A | * | 1/1986 | Olsson et al. | ............... 198/778 |
| 4,591,333 A | * | 5/1986 | Henke | ...................... 126/21 A |
| 4,603,776 A | * | 8/1986 | Olsson | ...................... 198/778 |
| 4,612,911 A | * | 9/1986 | Onodera | ...................... 99/477 |
| 4,792,303 A | * | 12/1988 | Stewart et al. | ............... 110/248 |
| 4,893,708 A | | 1/1990 | Machacek | |
| 4,899,871 A | * | 2/1990 | Olsson | ...................... 198/778 |
| 4,941,567 A | * | 7/1990 | Olsson | ...................... 198/778 |
| 5,109,758 A | * | 5/1992 | Voegtlin | ................... 99/443 C |
| 5,131,172 A | | 7/1992 | Stevenson et al. | |
| 5,161,315 A | | 11/1992 | Long | |
| 5,203,256 A | * | 4/1993 | Mueller | ...................... 99/476 |
| 5,205,135 A | | 4/1993 | Lang | |
| 5,243,962 A | * | 9/1993 | Hwang | ...................... 126/21 A |
| 5,329,916 A | * | 7/1994 | Lygum | ...................... 432/14 X |
| 5,343,715 A | | 9/1994 | Lang | |
| 5,448,898 A | | 9/1995 | Rothstein | |
| 5,478,584 A | | 12/1995 | Donohue et al. | |
| 5,515,775 A | * | 5/1996 | Crump, III et al. | ........... 99/479 |
| 5,651,191 A | | 7/1997 | Walunas et al. | |

\* cited by examiner

Primary Examiner—Timothy F. Simone
(74) Attorney, Agent, or Firm—Mallinckrodt & Mallinckrodt; Robert R. Mallinckrodt

(57) ABSTRACT

An apparatus for treating items such as for freezing, drying, or baking food items, includes an inclined track or trough with a perforated bottom through which pressurized treating gas flows to raise the item and hold it suspended above the bottom of the trough to allow the item to move by gravity down the trough as the treating gas, such as a cooling or refrigerating gas when the item is being cooled or frozen or a hot gas when the item is to be cooked, flows under, around, and over the item to be treated to thereby treat such item. It is preferred that the trough be a spiral trough surrounding a chamber containing pressurized treating fluid which flows from the chamber into a plenum under the perforated trough bottom, through the perforations and around the item and then out of the trough. The items can be stopped in the trough so that they remain for a predetermined treatment time.

41 Claims, 10 Drawing Sheets

Figure 1:
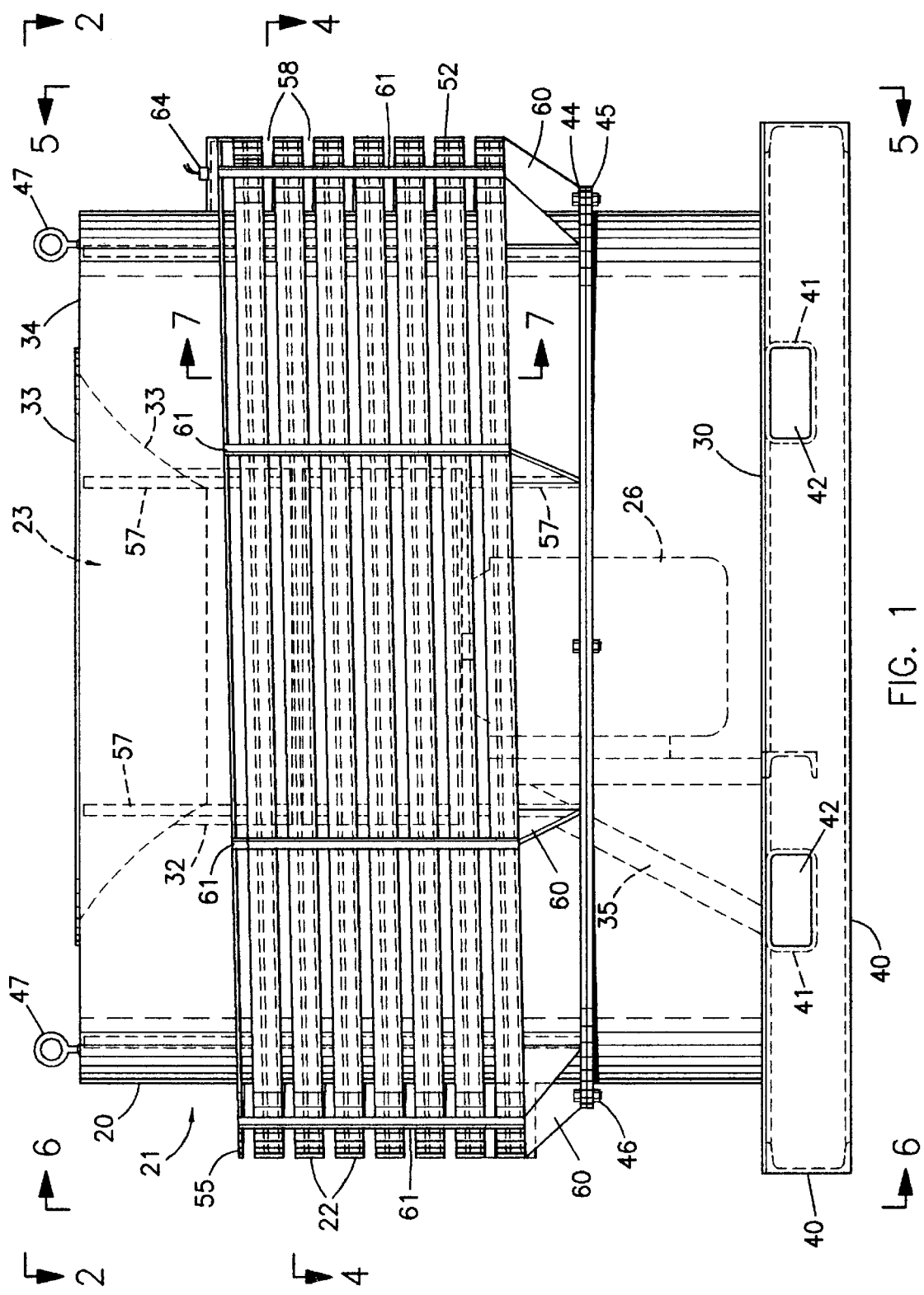

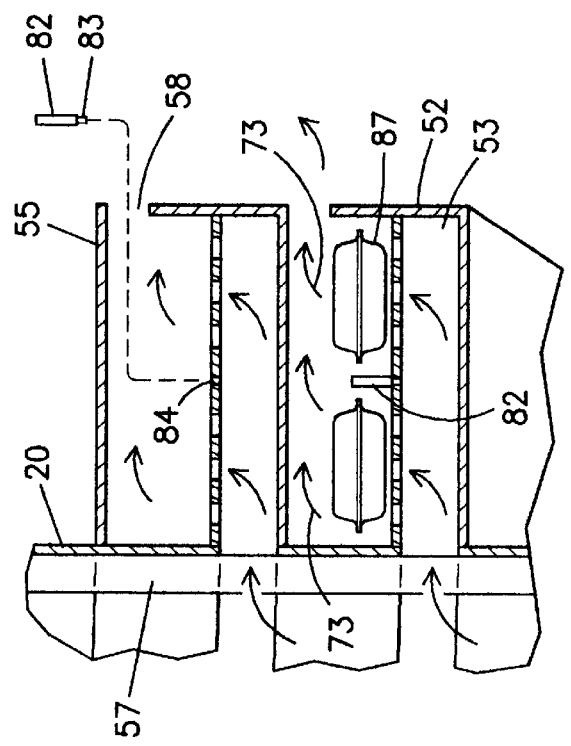
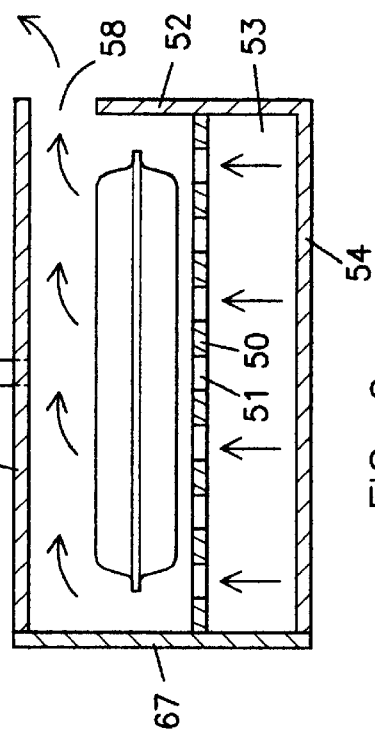
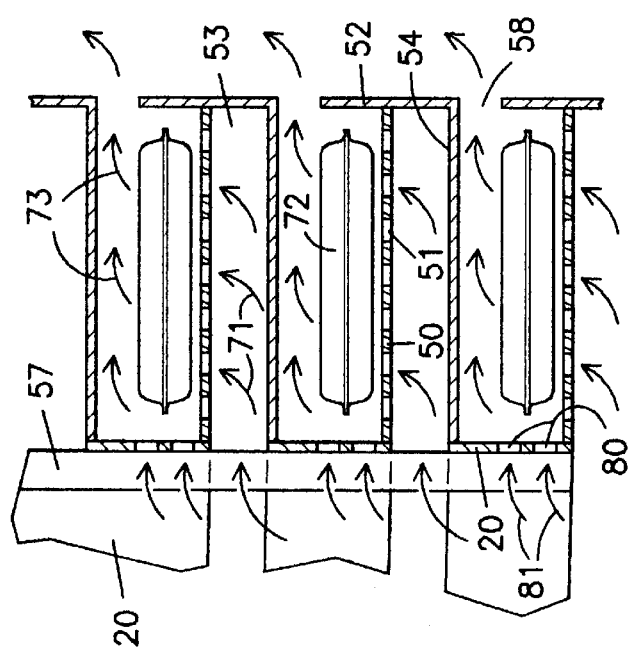
FIG. 10
FIG. 9
FIG. 8

APPARATUS FOR TREATING AN ITEM DURING TRAVEL OF THE ITEM ALONG A TREATING TROUGH

RELATED APPLICATIONS

This is a continuation-in-part of copending application Ser. No. 09/360,755, Filed Jul. 26, 1999, pending and entitled "Food treating Device."

BACKGROUND OF THE INVENTION

1. Field

The invention is in the field of treating and conveying apparatus, such as food freezing, cooling, heating, or cooking apparatus.

2. State of the Art

Various types of fluidized bed conveying apparatus are known as are various types of food cooling, freezing, heating, and cooking apparatus wherein food products are cooled or heated while being conveyed through the apparatus. An example of a combination of such apparatus is a fluidized bed dryer which utilizes a hot air stream passing upwards through a directional oscillating or vibrating perforated plate onto which is fed a stream of particles to be dried, the air stream lifting and passing around and between the particles causing a transfer of heat from the air stream to the particles and a transfer of moisture from the particles to the air stream.

Freezing apparatus is also known wherein a continuous upward spiraling mechanical conveyor conveys various random shaped products in a spiral path through a housing containing refrigerated air. The products freeze while being conveyed. Typically, a freezer of this type is very space and heat transfer inefficient and expensive to build.

U.S. Pat. No. 4,177,647 shows a freezer having a helical conveyance deck down which relatively large packages of packaged product flow by gravity on a thin layer of pressurized freezing air. Rectangular apertures open from a plenum chamber through the conveyance deck to provide an angled flow of pressurized freezing air. Blowers are positioned horizontally or at an angle to the axis of the helical conveyance deck to draw air over refrigeration coils and supply freezing pressurized air to the plenum chamber.

SUMMARY OF THE INVENTION

According to the invention, a treating apparatus particularly useful for treating food items such as by freezing, cooling, drying, warming, or cooking such items, includes an inclined track or trough having perforations through which air or other treating gas flows to lift and support such items as they move by gravity down the trough. The trough preferably has a symetrical spiral or helical configuration. The apparatus works well as a freezing device with refrigerated air used to support and treat (cool and freeze) the items as they flow down the trough. The apparatus can also be used to cook items by using hot air of appropriate temperature rather than refrigerated air. The apparatus can also be used for cooling using ambient or cooled air, for drying using dry air, for smoking or flavoring using smoke or flavored air, or for various other uses.

A preferred embodiment of the invention, when used as a continuous freezer, consists of a spiraling trough into which items to be frozen are fed in at the top, with the items then spiraling downwards by gravity in the trough in a substantially circular or elliptical path. A pressurized gas or air stream is forced into a continuous cavity or plenum chamber under the spiraling perforated plate bottom of the continuous spiraling trough, floating the items above the perforated plate. The spiraling trough follows a continuous downward path which the individual pieces or items of product being treated follow; being conveyed by gravity and supported by floating on the pressurized air or gas stream in a near frictionless travel, until the items reach the bottom of the spiral and pass out of the spiral by a straight outlet extension of the spiral conveying means. With treatment completed, the items pass from the outlet to other conveying or collecting means to move the items to further processing, packaging, or storage.

The spiral conveying apparatus forms a symmetrical housing or "spiral drum" enclosure in which a fan is placed to provide circulating gas and to provide pressure in the plenum chamber under the spiraling perforated plate. This fan is preferably a centrifugal or plug fan on a vertical shaft extending up and into the center of the spiral drum. The gas enters a duct leading into the center of the centrifugal fan rotor where it is forced through the fan into the open area forming a pressure chamber inside the spiral drum, then into the plenum chamber and through the perforated plate in the product trough, and around the product being conveyed and treated. When the apparatus of the invention is being used as a freezer, the gas may be conventional refrigerated air, or the gas may be cooled by injecting liquid cryogenic gas such as liquified nitrogen or carbon dioxide into the refrigerated air or into ambient or otherwise cooled air. When used as a baking, cooling, or drying device, it may be operated with hot air, ambient air, or dry air. The apparatus may contain a heat or refrigeration source or heated, refrigerated, or cryogenic gas may be fed to the apparatus or the apparatus may be located in a refrigerated or heated compartment, space, or room. The gas may be recirculated or merely exhausted. The fan which supplies the pressurized air stream to the spiral is located inside the spiral drum. The duct leading to the center of the fan may conveniently be a gas inlet extending from the top of the housing or spiral drum to the inside of the fan.

THE DRAWINGS

Figure 2:
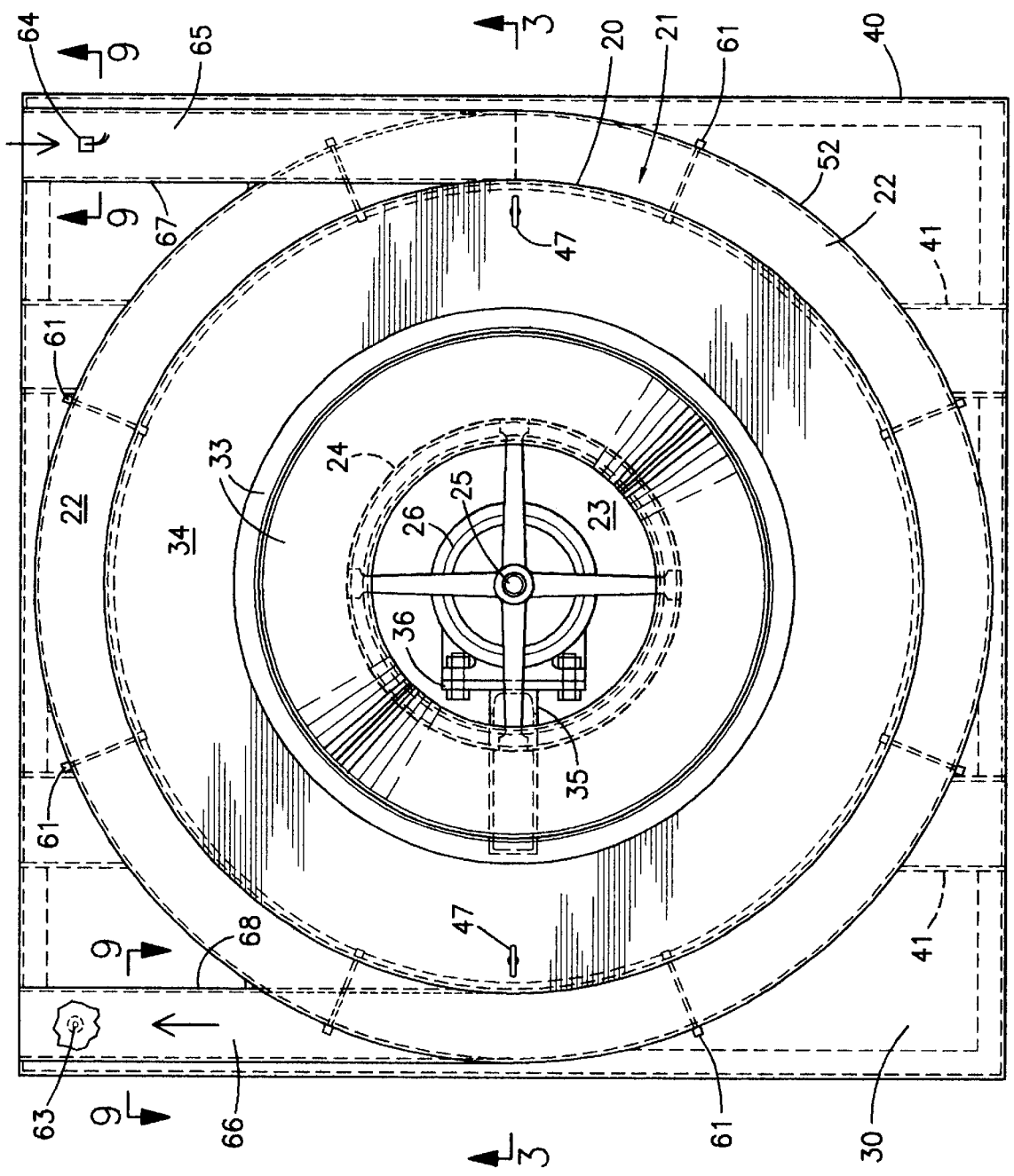
Figure 3:
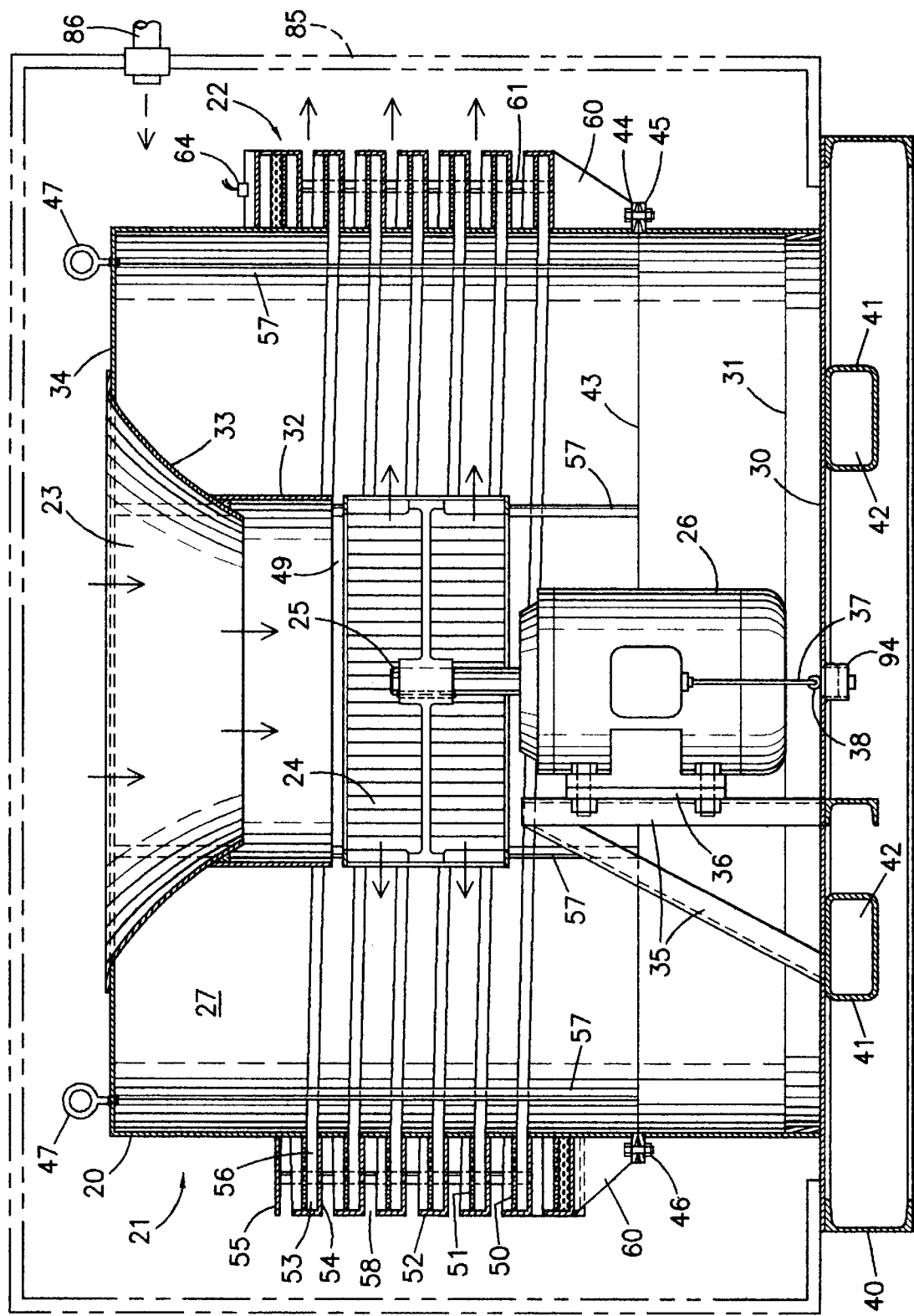
Figure 4:
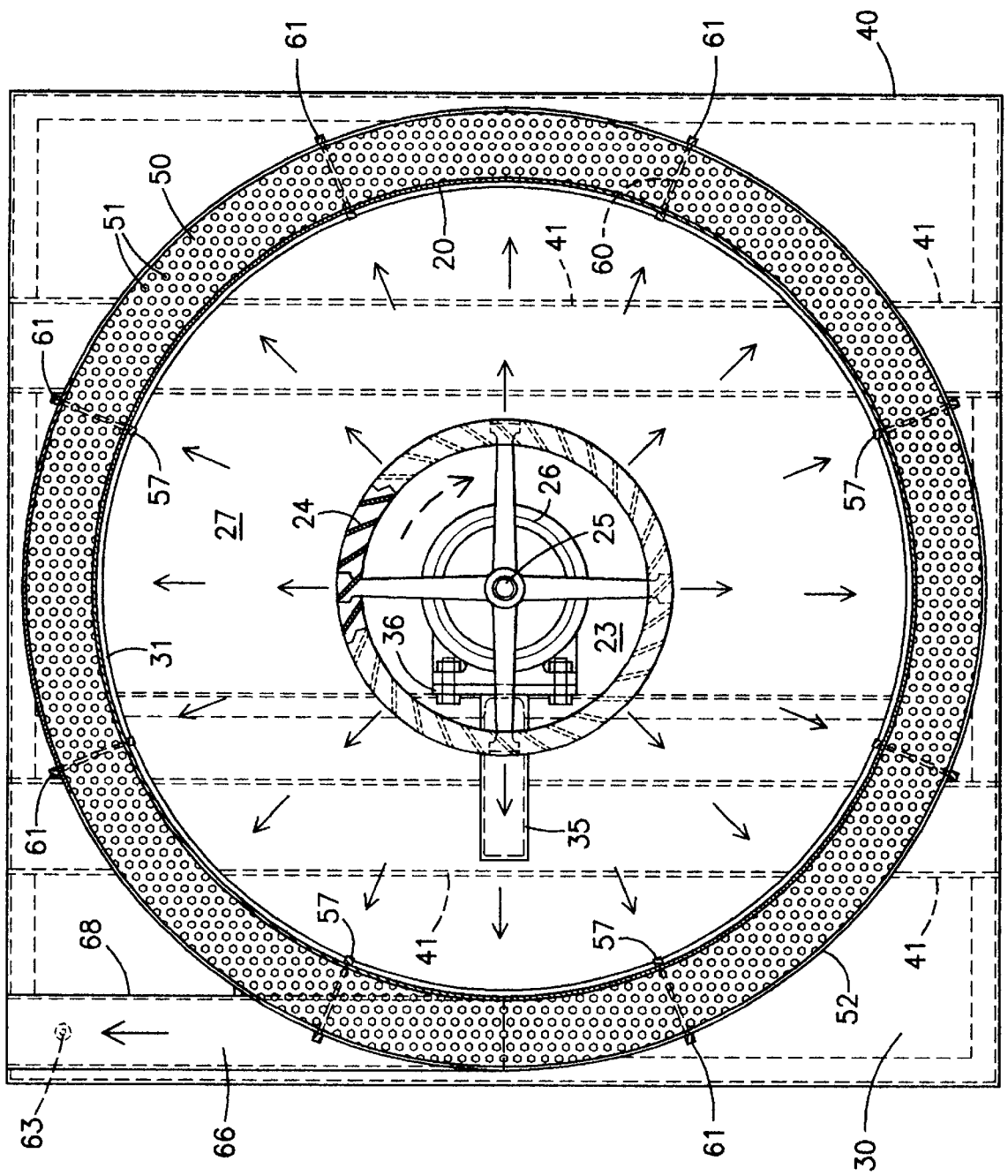
Figure 5:
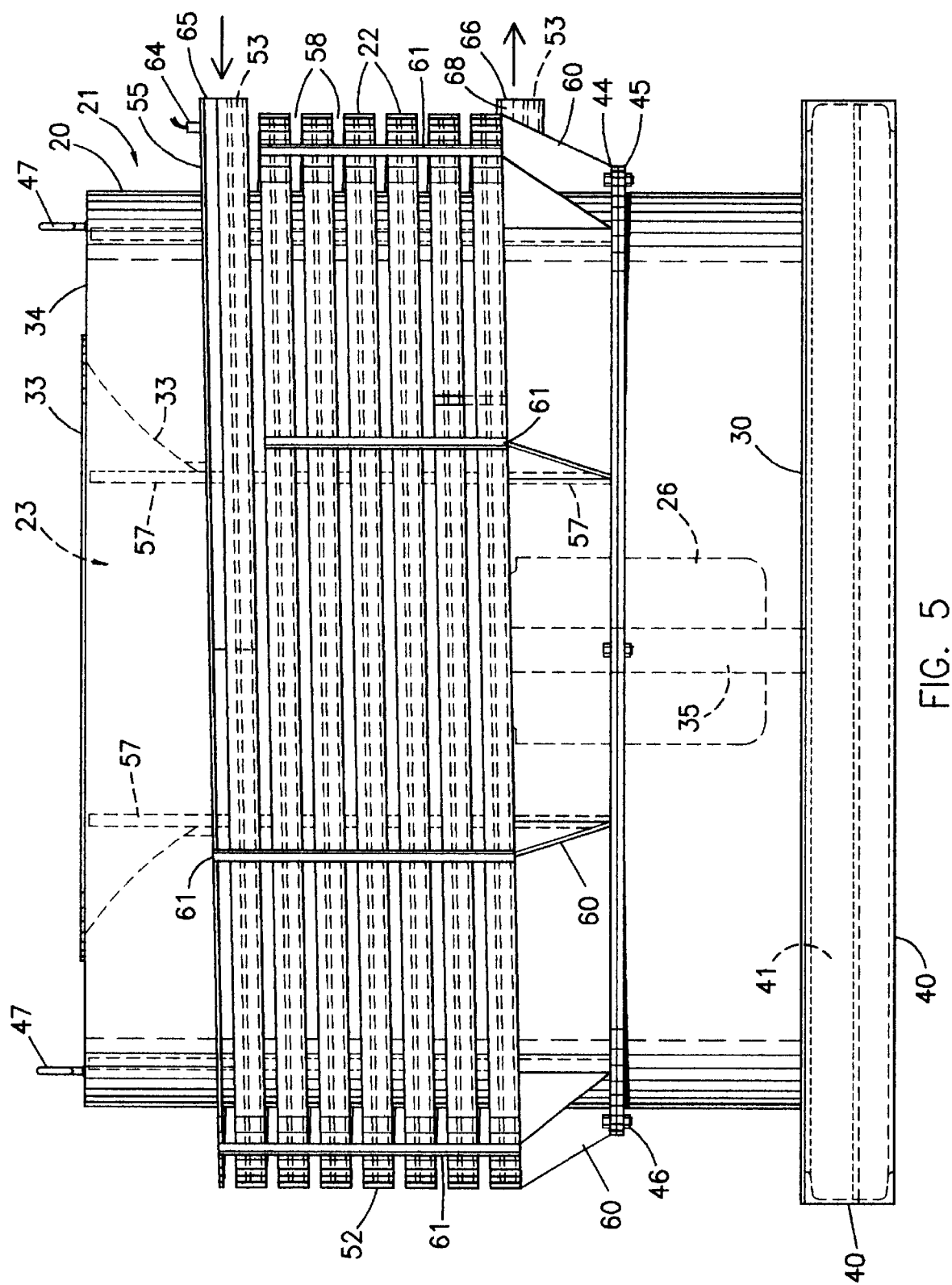
Figure 6:
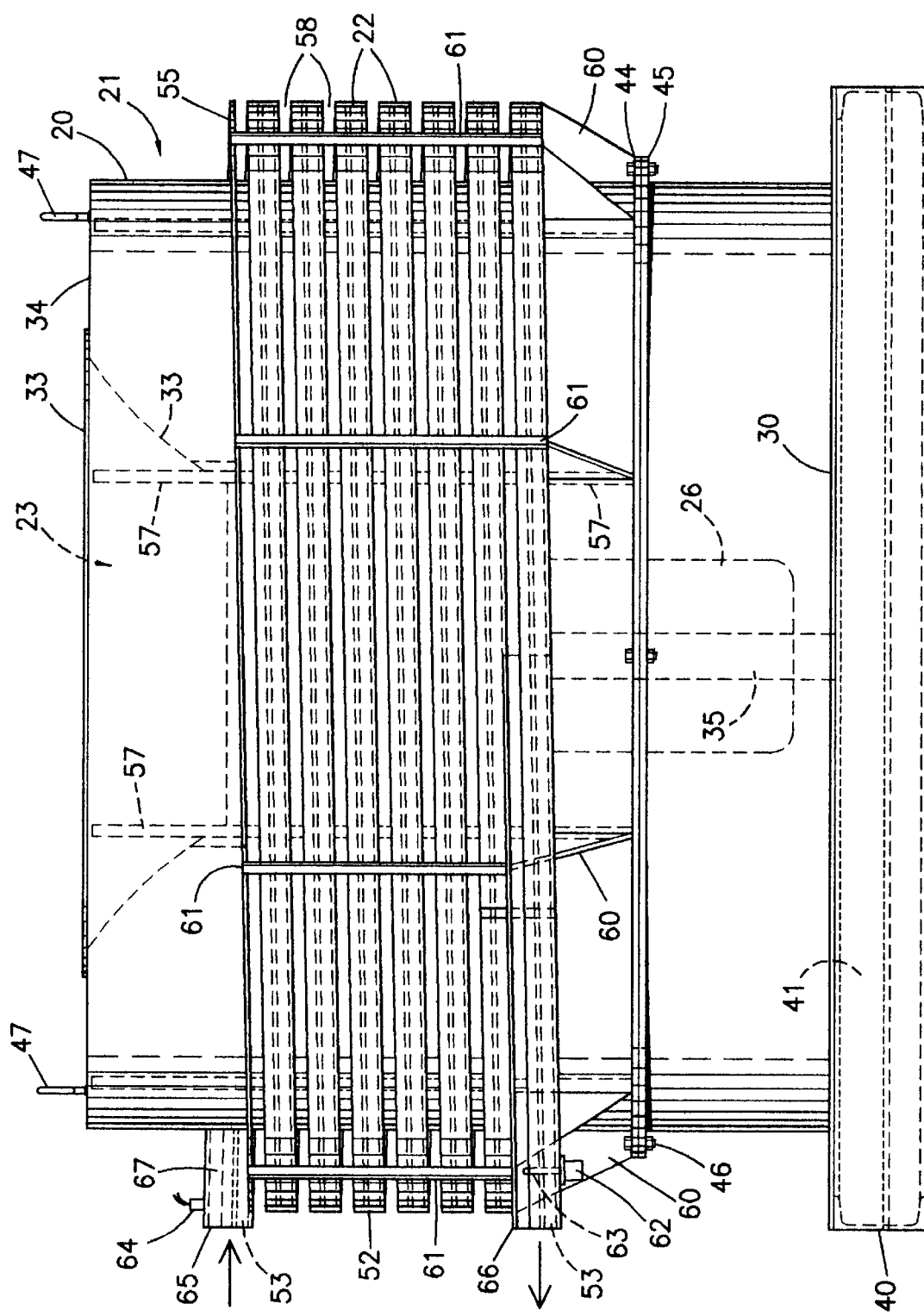
Figure 7:
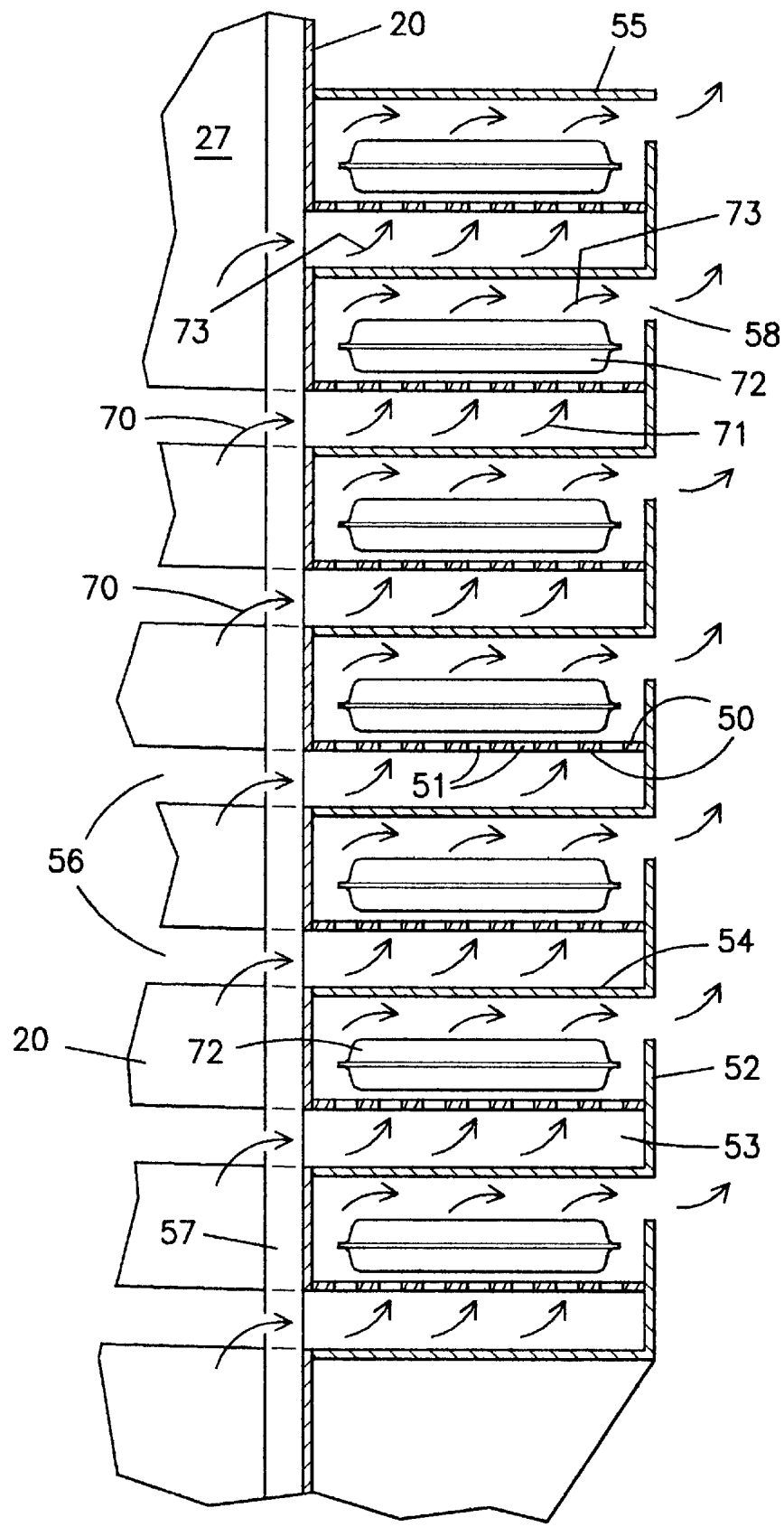
Figure 11:
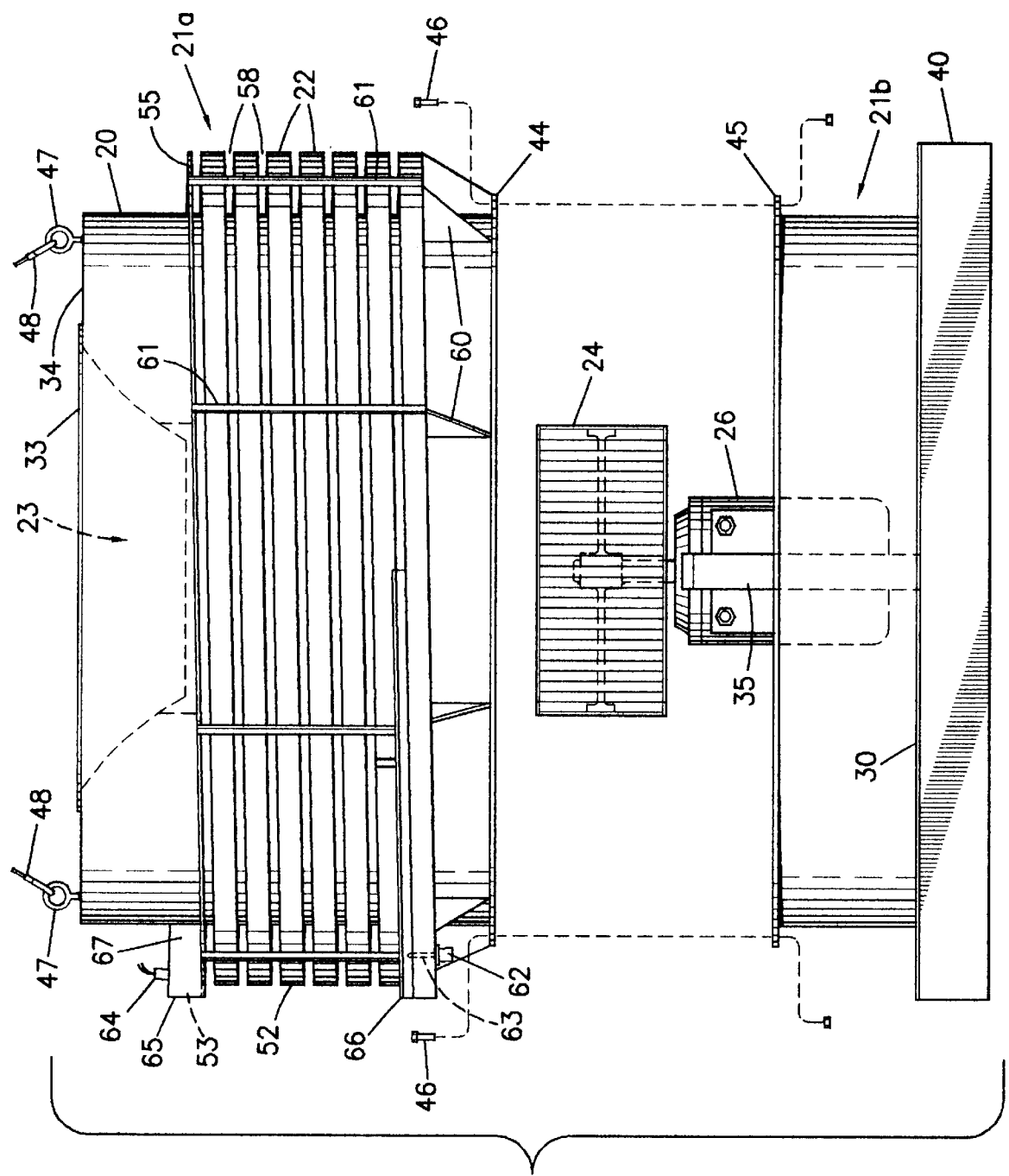
Figure 12:
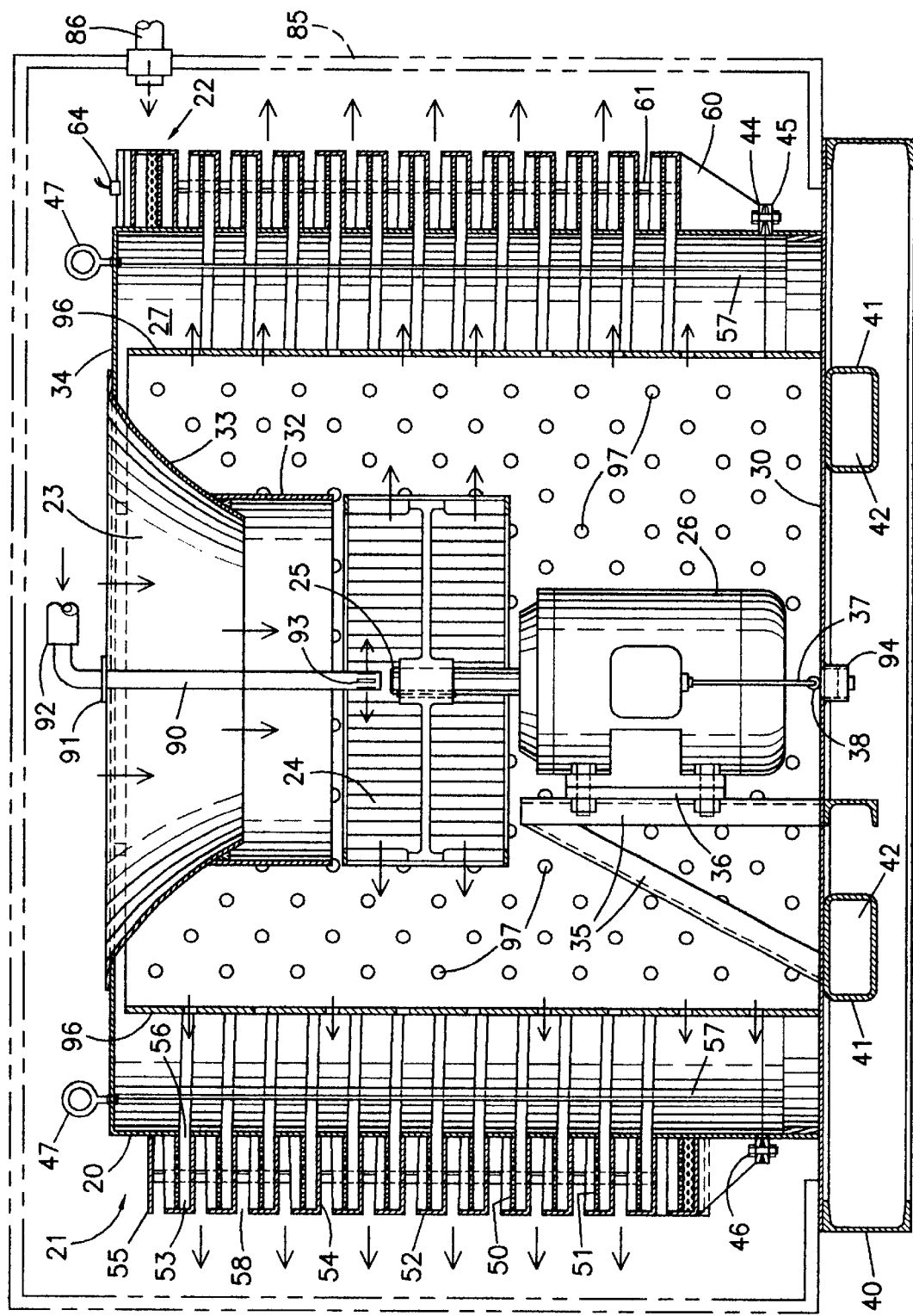

The best mode presently contemplated for carrying out the invention is illustrated in the accompanying drawings, in which:

FIG. 1 is an end elevation of a treatment device of the invention;

FIG. 2, a top plan view taken on the line 2—2 of FIG. 1;

FIG. 3, a vertical section taken on the line 3—3 of FIG. 2;

FIG. 4, a transverse section taken on the line 4—4 of FIG. 1;

FIG. 5, a side elevation taken on the line 5—5 of FIG. 1;

FIG. 6, an opposite side elevation taken on the line 6—6 of FIG. 1;

FIG. 7, a fragmentary vertical section of the track or trough taken on the line 7—7 of FIG. 1;

FIG. 8, a fragmentary vertical section similar to that of FIG. 7 but only showing three levels of the trough and showing a second embodiment of the trough;

FIG. 9, a vertical section through an end of the trough taken on one of the lines 9—9 of FIG. 2, showing the inlet portion of the trough or outlet portion of the trough, both such portions appearing the same;

FIG. 10, a fragmentary vertical section similar to that of FIG. 7 but only showing two levels of the trough and showing a third embodiment of the trough;

FIG. 11, a side elevation similar to that of FIG. 6, showing the an upper portion of the apparatus separated from the lower portion of the apparatus; and FIG. 12, a vertical section similar to that of FIG. 3, but showing an injection pipe in the air inlet, a pressure equalizing baffle in the pressure chamber, and additional tiers of the trough.

DETAILED DESCRIPTION OF THE ILLUSTRATED EMBODIMENTS

In the embodiment of the invention shown in the drawings, a wall 20 forms a generally vertically oriented cylindrical inner housing or "spiral drum" indicated generally at 21 with a spiral track or trough 22 secured around the outside thereof. The cylindrical inner housing forms a pressure chamber for treating gas which enters the chamber through gas inlet 23 to a fan 24, FIG. 3, secured to motor shaft 25 extending from motor 26 which rotates the fan to draw treating gas in through inlet 23 and pressurize it in pressure chamber 27.

Cylindrical inner housing 21 has a floor 30 which seals the bottom of the chamber. Wall 20 along with reinforcing ring 31 is secured to bottom 30 such as by welding to securely hold the bottom to the walls and form an air tight seal. Cylindrical gas inlet walls 32 and gas inlet funnel walls 33 are secured in sealing manner, such as by welding, to a top wall 34, which is secured, such as by welding, to the top of side wall 20. Bracket 35 secured to floor 30 provides a secure mount 36 for motor 26. An electrical wire 37, FIG. 3, extends from motor 26 through grommet 38 in wall 20 to outside the inner housing 21 for connection to a conventional motor control and source of power, not shown. The motor control preferably provides for variable speed control of the motor (provides variable speed for the fan) for adjusting over a wide range the volume of air flow (also affects the speed of air flow) through the apparatus. Different air flows will be required to support different items above the perforated bottom of the trough.

Inner housing 21 is supported on structural channels 40 and floor reinforcements 41 which together support floor 30. Channels 40 are preferably cut at at least one set of open ends 42 of floor reinforcements 41 so as to provide fork lift receiving openings to allow the apparatus to be easily lifted and moved by the forks of a fork lift. Motor 26, while shown within housing 21, may be located outside of housing 21 with a drive shaft either directly from the motor or coupled to the motor to drive the fan 24. However, such arrangement is not currently preferred because it complicates the simple and compact arrangement shown with the motor 26 located vertically in housing 21 and with fan 24 connected directly to the motor shaft 25.

Inner housing 21 is preferably divided along cut 43 in wall 20 into an upper portion 21a and lower portion 21b, FIG. 11. Mating flanges 44 and 45 extend outwardly from the upper and lower portions, respectively, along cut 43 so the upper and lower portions may be secured together by bolts 46, FIG. 3. While two bolts 46 are sufficient, four to six bolts evenly placed around the circumference of the housing are currently preferred. The connection should be substantially air tight so that pressure is maintained in the pressure chamber 27 during operations of fan 24. For this purpose, a gasket may be provided between the upper and lower portions, but is generally not necessary. With this arrangement, housing 21 may be easily separated by removing bolts 46 and lifting the upper portion 21a off the lower portion 21b, FIG. 11, for cleaning of the interior of inner housing 21, for repair of the single moving parts of the apparatus—the motor 26 and fan 24, or for other repair, if necessary. Motor 26 and fan 24 remain in the lower portion 21a while walls 32 and 33 forming inlet 23, being secured to upper portion top wall 34, are lifted with the top portion 21b. Lift rings 47 are preferably provided to aid in separating the upper and lower housing portions through attachment of lifting cables 48.

Inlet cylindrical walls 32 are arranged to end just above the top of fan 24 to substantially prevent escape of pressurized gas from pressure chamber 27. While various gaskets or other seals may be used between the bottom of walls 32 and fan 24, it has been found that the bottom of cylindrical walls 32 may be arranged to just lightly touch fan 24 or may form a gap 49, FIG. 3, of up to about one-eighth inch, without substantially affecting the pressure of the gas in pressure chamber 27, and without requiring any seals or gaskets.

Trough 22 includes a perforated bottom plate 50, FIGS. 3, 4, and 7, with perforations 51, and an outside side plate 52. Side plate 52 extends below perforated bottom 50 to form a side of a plenum chamber 53 which has a bottom 54 which also forms a top for the trough immediately below it. For the top tier spiral trough and the inlet and outlet portions of the trough, a top 55 is provided. Perforated bottom plate 50, at least for food applications, is preferably made of stainless steel, of between about 0.9 to 1.0 mm thickness, although other thicknesses of stainless steel, or plastic or various other materials could be used. The perforations through the plate are preferably about 1.5 mm in diameter but could go up to about 3.0 mm. The 1.5 mm perforations are currently preferred because the volume of air flowing through a 1.5 mm hole is about one-half of that flowing through a 2 mm hole, and much less than that flowing through a 3 mm hole, at a set pressure so more perforations can be used with a given volume of air flow with the smaller perforations, thus spreading the supporting air streams from the perforations out more. The perforations are spaced between about three mm and fifty mm apart, and preferably spaced between about three mm to twenty-five mm apart. A spacing of perforations on nine mm centers has been found to work well. This has been found to provide satisfactory lifting and supporting force for items to be treated. The perforation are preferably circular, elliptical (oval), or teardrop shaped but can be of various configurations. When diameter is referred to for such non-circular perforations, the largest dimension may be considered the diameter. The flow of treating gas through the perforations can be controlled by controlling the treating gas throughput of the apparatus. This can be easily controlled by controlling and adjusting the speed of the motor 26 which controls the speed of fan 24. Control of the motor and fan from about one RPM to the maximum motor speed is presently preferred so the velocity of the air stream through the perforations impinging directly against the item being supported and treated can be varied as needed from about five MPH to well over fifty MPH, and approaching one hundred MPH or more, if desired. It has been found that a velocity of about five MPH will float a potato chip and not blow it off the trough, while about twenty-five MPH will support a waffle. As indicated below, velocities of about fifty MPH are advantageous, but not necessary.

Plenum 53 communicates with pressure chamber 27 through spiral opening or slit 56 in wall 20. Wall 20 is reinforced through the height of spiral opening or slit 56 by braces 57, although slit 56 can be discontinuous so such braces are not needed. Thus, pressurized treating gas from pressure chamber 27 passes through slit 56 into plenum chamber 53 and then through perforations 51 in perforated plate 50 and out through an outer trough side opening 58. Trough 22 may be reinforced by bottom braces 60 and side braces 61.

Trough 22 is generally provided with an inlet portion 65, FIGS. 2, 5, and 6, and an outlet portion 66 which extend tangentially to the cylindrical housing 21 at the top and bottom of the trough. In order to provide a treating gas supply to support the items in the trough in the inlet and outlet portions 65 and 66 of the trough, plenum chamber 53, FIGS. 5, 6, and 9, is continued to the ends of the inlet and outlet portions as shown. However, since the inlet and outlet portions do not remain immediately adjacent inner housing wall 20, FIGS. 2, 5, 6, and 9, there is no side connection to inner housing wall 20. Additional inner walls 67 and 68 for the inlet and outlet portions of the trough, respectively, are provided to take the place of wall 20, which forms the inner trough wall when the trough is adjacent inner housing 21. The pressurized treatment gas in the inlet and outlet portion plenums flow from the remaining part of the plenum.

In use, an item to be treated, such as a food item, is placed in the trough at the inlet, such as by a conveyor belt or other equipment. The item is supported in the trough by treatment gas flow through the perforations in the perforated trough bottom and the item travels by gravity, guided by the trough walls and gas flow around the item, down the track. The treated item is removed from the outlet portion such as by moving off the outlet end of the trough onto a conveyor belt or other conveying apparatus where the item is transported, for example, to packaging apparatus or to storage. A gate or other stoppage means such as a solenoid operated plunger assembly 62 with plunger 63 extending through the trough bottom plate 50, FIGS. 2 and 6, may be provided in the outlet portion or at other locations along the trough to stop the flow of items down the trough when desired to ensure that the items remain in the trough for the desired retention treatment time. With plunger 63 extending through the bottom plate 50 of the trough, items moving down the trough will be stopped by plunger 63 and will back up in the trough behind plunger 63. Upon operation or actuation of the solenoid operated plunger assembly 62 to pull plunger 63 below the level of the bottom plate 50 of the trough, items will move down the trough over the retracted plunger. Generally, plunger 63 will be biased to its raised position so that after actuation, a single item will pass over the plunger and the plunger will raise again to stop item flow until again actuated.

In one mode of operation, upon start up of the apparatus the plunger will stop flow of items until the first item has been held in the trough for at least the desired retention time. The apparatus will be matched to the production line of items being treated so that items will not be produced faster than they can be treated. Once the first item has been held in the trough for at least the desired retention time, the next item entering the trough at the inlet will be sensed, such as by sensor 64 which may be an electric eye sensor or any other sensor that detects when an item passes the sensor, and upon such sensing of the item entering the trough, an item will be released from the outlet portion of the trough. With production matched to the treatment time of the treating apparatus, an item can be released from the outlet portion of the trough each time an item enters the inlet portion of the trough. The solenoid plunger or other gate device will be operated to release an item in response to sensor 64 sensing an item entering the trough.

As shown by FIG. 7, during operation of the apparatus, treating gas from pressure chamber 27 passes through slit 56 into the plenum chamber 53 as shown by arrows 70. From plenum chamber 53, the treating gas passes through perforations 51 in perforated trough bottom 50 as shown by arrows 71 to support an item 72 to be treated above trough bottom 50 in a manner so item 72 travels down the trough. Side 52, along with the treating gas passing between the item and side 52, keeps item 72 in the trough during its slide. While in the trough, treating gas flows under, around, and over item 72 as shown by arrows 73 with such treating gas generally keeping the item floating above the bottom of the trough and away from wall 20 and side 52. The bottom 54 of the plenum chamber 53 forms a top for the trough below it. Such top of the trough directs the treating gas over the top of the items as the gas flows toward opening 58. The treating gas then flows out of the trough through opening 58.

The apparatus can be used for various treatments depending upon the treating gas used. For example, if the treating gas is freezing gas, the apparatus operates as a freezer with the freezing gas passing around the items to be treated freezing the items. If the treating gas is hot gas, the apparatus operates as a heater or oven with the hot gas passing around the items to be treated heating or cooking the items. If the treating gas is drying gas, the apparatus operates as a dryer with the drying gas passing around the items to be treated drying them. If the treating gas is a flavoring gas or has flavoring material entrained therein, the apparatus operates as a flavoring apparatus with the treating gas passing around the items to be treated, such as food items, flavoring them. Various types of treatments can be performed on various items depending upon the treating gas used.

The invention can be used for treating, e.g., freezing, cans of product such as cans of juice concentrate. In such instance, the trough is made just slightly wider (one-eighth to one-half inch wider) than the can to be treated is long so the can will roll and be guided down the trough without getting stuck in the trough. While the can will not generally be lifted off the bottom of the trough, nor is that necessary with a can that can roll down the trough, the can will generally be lightened by the air flow through the perforated bottom of the trough. When using the apparatus for cans, it will generally be necessary to provide more clearance between tiers of the trough than normally provided or desired for treatment of relatively flat items.

Although the percentage of open area in a perforated plate used in fluidized bed treating apparatus typically is much more than 20%, the percent of open area in the perforated plate of the present invention is preferably in the range of about 0.5% to 20% depending upon the configuration and weight of the product being conveyed through the invention. Open areas making up about 5% have been found to work well with most products. The main consideration regarding the configuration and weight of the item being supported and treated is the speed and volume of gas passing through the perforations in the trough bottom 50. The air volume used in the invention will typically be substantially less, and usually no more than about half, the air volume required for conventional fluidized bed treatments, or prior art food treating devices such as the freezer of U.S. Pat. No. 4,177,647.

As shown in FIG. 8, if desired, additional perforations 80 may be provided in trough wall 20 just above trough bottom 50 to provide additional treating gas flow against a side and over the top of the item 72 to be treated as shown by arrows 81. If desired, perforations can also be provided in plenum chamber bottom 54 forming the trough top to supply additional treating gas to the top of the item, but this is generally not necessary. If desired, these side and/or top perforations may be angled to provide pressurized gas at an angle to the item to move the item along the trough. When floating in the near frictionless state on air passing through the bottom perforations, air directed onto the side and/or top of the items can move the items along the trough, particularly if the trough is generally level, although such gas can also cause the items to move upwardly in the spiral trough described.

FIG. 9 shows air flow in the inlet 65 and outlet 66 portions or extensions of the trough where there is no connection along the side to the inner housing wall 20 but treating gas merely flows through the plenum chamber 53. The inside wall is shown as inlet portion inside wall 67, but the outlet portion is the same with the inside wall being 68 rather than 67. If desired to provide gas flow through the top 55 and/or inside side walls 67 or 68 of the inlet or outlet portions, appropriate conduits could be added to connect perforations through the top and sides to pressure chamber 27.

In some instances, such as when the width of the trough is made wide enough for relatively wide items, it will be desirable to divide the trough into two, or possibly more, side by side tracks for travel of narrower items in the trough when narrower items are to be treated. For this purpose, a divider 82, FIG. 10, divides the perforated trough bottom plate 50 into two side-by-side tracks for travel of narrower items 87 down the trough. It is preferred that the tracks may be easily set up and removed so divider 82 includes pins 83 which fit into receiving holes 84 in perforated trough bottom plate 50. Divider 82 will be provided in sections so it can be easily added or removed, as desired. Such sections will generally be in lengths up to about a quarter of a circle and sized, as shown, to fit through opening 58. The total height of dividers 82 and pins 83 will be less than the height of opening 58. If opening 58 is three-quarters inch, the height of divider 82 with pins 83 can be five-eights inch. Also, the divider may be made of various materials, such as plastic, to make it easy to handle.

Treating gas may be exhausted to the atmosphere through opening 58 or the apparatus may be placed in an outer housing such as shown schematically by broken lines 85 in FIG. 3 so that the treating gas passing out of the apparatus through opening 58 is collected in the housing and recirculated through the apparatus by being drawn back into the apparatus through gas inlet 23. In such situation, provision is made for the entrance to and exit from the housing 85 of items to be treated. Where the treating gas is held in a housing such as 85 surrounding the apparatus and is recirculated through the apparatus, the apparatus can include gas conditioning equipment such as cooling or freezing coils or heating coils or elements in the gas inlet area 23 of the apparatus. Treating gas pulled in through the gas inlet area 23 passes over such cooling or freezing coils to cool the gas or over the heating coils or elements to heat the gas, as desired. A desiccant dryer or other dryer or dehumidifier may be included in gas inlet 23 or in pressure chamber 27 to dry the gas. When using cooling or freezing coils, drying the gas will reduce ice build-up on the coils from the moisture released from items being frozen. Additional treating gas, when needed, is fed into the housing 85 through an inlet 86.

When used as a freezer, gas entering apparatus gas inlet 23 may be conditioned with the addition of cryogenic gas or liquid such as liquified $CO_2$ or liquified nitrogen as it enters. The use of nitrogen gas as the conditioning gas has the advantage that nitrogen has preserving qualities. The product items leaving the apparatus would have had all or nearly all oxygen removed while traveling through the treatment trough with the nitrogen acting as a preservative. The apparatus can be configured so that such treating nitrogen gas follows the items through packaging.

For addition of cryogenic liquid, gas, or other treating gas conditioning material, an inlet pipe 90 may be positioned in inlet 23 by bracket 91. The conditioning material, such as liquid nitrogen, is supplied through supply hose 22, and sprays through outlets 93 in inlet pipe 90 into the gas being drawn through inlet 23 into fan 24. This conditioning material will thoroughly mix with the gas going through the fan into pressure chamber 27. Supply hose 92 is preferably flexible so it will flex, if necessary, when the upper housing portion is lifted from the lower housing portion. It should be realized that with this arrangement, freezing coils may be used as the primary source of freezing air for the apparatus. When extra freezing is desired, cryogenic freezing liquid or gas may be injected through inlet pipe 90. Inlet pipe 90 can be and remain in place whether or not in use.

As indicated, the cryogenic freezing can be used with or without other cooling or freezing. When used, the injection of the cryogenic liquid or gas is controlled to preferably maintain the temperature of the gas in the pressure chamber at between about minus thirty to minus fifty degrees centigrade, and preferably about minus thirty-five degrees. This is a higher temperature than the generally about minus seventy to eighty degrees usually used in cryogenic freezing, but it has been found that with the air circulation about the item to be frozen, the higher temperatures used with the apparatus of the invention are as effective as the lower temperatures generally used with other cryogenic freezing equipment. This higher temperature also eliminates the need for use of special low temperature materials normally required when using the lower cryogenic temperatures. To control the temperature, a temperature sensor, not shown, can be placed to measure the temperature of the gas in the pressure chamber 27, and the injection of the cryogenic material controlled, either by the amount of such material injected on a substantially continuous basis or by periodic injections of the cryogenic material, to maintain the desired temperature.

It has been found that the apparatus works very effectively if located in a special environment such as in a freezer, blast freezer, or other cold or hot treatment room. For example, the apparatus may be located in a freezer or blast freezer (these are generally room-size freezers) and operated in such room. The freezing air in the freezer room is drawn into the apparatus through the gas inlet 23 and exits through opening 58 back into the freezer room. No additional air cooling is needed. This significantly reduces the cost of the apparatus for those who have a freezer or blast freezer that can accommodate the apparatus since no refrigeration equipment is needed as part of the apparatus. Provisions need to be made for getting the items to be frozen into the room. This can be by any known conveying apparatus such as conventional conveyor belts, or even in batches by carts. Such items freeze much faster in the apparatus than by just sitting in the freezer.

If desired, the cryogenic conditioning of the gas can be used with the apparatus in a closed freezer room when additional cooling of the gas is needed. However, care needs to be taken using such gas in an enclosed area where humans can enter and remain to provide the necessary ventilation to eliminate the chance of suffocation from lack of oxygen.

Inlet pipe 90, FIG. 12, can also be used in cleaning the apparatus. A hot detergent water solution can be supplied through supply hose 92 and inlet pipe 90 to inlet pipe outlets 93 from where they spray into fan 24. The detergent in the water makes suds that fill or partially fill chamber 27 with suds. Alternately, or in addition, a foaming agent could be used. The foam flows through slit 56 into plenum chamber 53 and through perforations 51 cleaning them and picking up and carrying the smaller particles. Larger particles in the plenum 53 collect on the plenum bottom 54 and can flow out a drain in the outlet portion 66 of the trough at the lower end of the plenum and larger particles in the chamber 27 collect on the bottom 30 and can flow out drain 94 with the wash water. When a drain 94 is provided, bottom 30 is preferably sloped at least slightly to drain 94 to aid in draining the housing. After the detergent water and/or foaming agent, clear hot rinse water is injected into the apparatus through the fan to rinse the inside of the apparatus. The whole apparatus can then be hosed off. The apparatus can then be run to dry it before use. If this washing technique is to be used, motor 26 should be a sealed motor appropriate for underwater use.

It has been found when freezing items, that an air velocity around the items of about fifty mph tends to sweep or strip away a warm layer encompassing the product for faster freezing of the product. Thus, although the invention provides substantially faster freezing of items to be frozen than other freezers, if the velocity of the treating gas from the perforations impinging on the items can be maintained at fifty MPH or more, the freezing is even faster. For example, in a conventional freezer a pot pie takes about one-and-one-half hours to freeze while in the invention, the same pie is frozen in less than one hour. A four ounce beef patty which in the best prior art freezers takes about three minutes to freeze, takes less than two minutes to freeze. A five ounce boneless chicken breast which in prior art freezers takes about fifteen minutes to freeze takes about seven minutes to freeze. The apparatus of the invention is effective because the product being treated is very close to the treating gas exiting the perforations in the bottom of the trough. Thus, the air exiting the trough perforations can impinge upon the surface of the item substantially at the velocity at which it travels through the perforations, e.g., fifty mph, rather than slowing down before impingement upon an item spaced further from the perforations. The items to be treated may be elevated from about one-sixty-fourth inch to about one-eighth inch above the bottom of the trough. Even with the air velocity well below the fifty mph, the apparatus freezes items significantly faster than other freezers. However, for fastest freezing, use of the highest velocity usable up to the about fifty MPH or more is preferred.

It is believed that the speed of freezing using a given temperature of freezing gas will increase as the velocity of the gas impinging directly upon and flowing around the item increases to about fifty MPH due to the stripping away of a warm air layer next to the item. Velocities above about fifty MPH do not appear to add to freezing speed as the warm air layer has already been stripped away. Increased speed may be beneficial by providing a higher gas speed as the gas flows around the item away from the site of direct impingement. However, the useable velocity may be limited by the weight of the item being frozen because the item needs to travel in the trough without being blown out of the trough or against the top of the trough. Further, as the item is lifted further off the bottom of the trough, i.e., beyond the about one-eighth inch, the treating gas will slow down before impinging on the item. Thus, operating parameters of the apparatus should be adjusted for particular items to be treated. A benefit of faster freezing is that less moisture is lost from the item during freezing. This is particularly important for dough items and ice cream items.

In some instances, it may be desirable to provide a fast surface freeze for a product entering the trough of the apparatus, and for that a different perforation pattern in the trough with closer spacing of perforations or with larger or differently shaped perforations may be desirable. For Example, with a very moist item to be frozen, such as some fish fillets, it may be desirable to provide larger holes for greater air flow and faster initial freezing of the outside surface of the item in the inlet portion of the trough to reduce the chance of moisture falling from the item into or onto the holes and freezing, or for a drop of moisture to freeze between the item and the trough bottom thereby sticking the item to the trough. The number of larger holes and the length of the inlet section with larger holes, or with other variations in hole size, spacing, shape, or arrangement, will generally be determined by how much moisture may come off the product item before the outside surface of the item freezes or gets a thin coating of ice on it to seal the surface of the product. The length required for such inlet portion will usually be less than one tier of the apparatus, which may be up to about fifteen feet, however longer inlet portion may be desirable. Further, additional side and top perforations may be desirable through the inlet portion, that are not necessary through the rest of the trough. However, in most cases, it should not be necessary to make the inlet portion of the trough any different from the remainder of the trough. Being sure that the edges of the perforations are smooth where they join the trough bottom (this is done in manufacturing) also helps to prevent ice buildup in the perforations or bottom of the trough.

As indicated, the apparatus may vary in a number of aspects depending upon the items to be treated and the treatment desired. It has been found that a cylindrical inner housing of about fifty one and one-half inches with a trough about four and one-quarter inches wide giving an apparatus outside diameter (diameter to outside of trough) of five feet works well. This provides tiers having a trough length of about fifteen feet for each tier. However a wide variety of sizes may be used with diameters of from about two feet to about eight feet with troughs of from about one inch to about thirteen inches currently contemplated as being most useful. While seven tiers have been shown for the apparatus of FIGS. 1–11, the number of tiers used can vary greatly. As shown in FIG. 3, where the height of the tiers is about equal to the height of the fan 24, and the tiers are located radially of the fan, the pressure in the pressure chamber 27 will substantially equalize and the pressure supplied to plenum chamber 53 will be substantially equal throughout the entire length of the trough, including inlet and outlet portions. Where a greater number of tiers are used, such as thirteen tiers shown in FIG. 12, so that they extend over a greater height of the inner housing wall 20, it may be that a pressure differential will exist between the upper and lower tiers not directly adjacent the fan 24 and the middle tiers directly aligned with the fan. In such case, a baffle, such as a perforated cylindrical insert 96, FIG. 12, with holes 97 can be inserted into pressure chamber 27. This baffle helps to equalize the pressure over the entire pressure chamber 27 to help equalize the pressure in the plenum chamber 53 of the trough regardless of the location of the portion of the trough in relation to the fan. The open area of the baffle may range from one percent to fifty percent but should be greater than the open area of the trough. A height of the inner housing of about four and one-half feet has been found to accommodated the seven tiers and up to the thirteen tiers illustrated. The height of the inner housing can be increased for the addition of more tiers.

While the air velocity has been emphasized for the freezing aspect of the invention, it should be noted that the movement of air around the item to be treated also improves other treatments. Movement of the air acts as a convection oven during cooking of items using heated treatment gas, and also aids in drying and dehydrating items. The moving air can be used for smoking or flavoring of items because the moving air can entrain flavoring materials and deposit them on the items being treated and act as an aerosol applicator. Flavoring or other treating materials can be injected into the treating air or gas similarly to the injection of the cryogenic materials discussed earlier. Also dryers or humidifiers can be provided in conjunction with the apparatus to dry or humidify the treating gas. A desiccant dryer can be located in the pressure chamber to control the moisture content of the treating gas.

Although the trough is preferably built in a circular spiral configuration as illustrated, it may also be elliptical, a modified square, rectangular, or of various other shapes with rounded corners which generally form a helix or spiral to allow flow of items to be treated as contemplated by the invention. Preferably the housing or "spiral drum" for the apparatus is symmetrical as is the trough extending therefrom.

An apparatus of the invention providing a spiral gravity feed trough and air flow around the items as described, could be constructed and operated as follows for freezing a sandwich product. Compressed carbon dioxide is used as the freezing means, i.e., the treatment gas. It is injected into the air stream in the air intake. The sandwich product is a cheese sandwich weighing about 80 grams. The product consists of two slices of bread with cheese inside. The crust of the bread has been removed and the edges crimped to seal the sandwich. The 20 mm thick×100 mm×100 mm product is fed into the invention at a rate of one unit about every second which is a rate of about 3600 units per hour. The temperature of the product going in is about 10° C. The retention time in the invention is about 13 minutes. The temperature of the treating gas in the pressure chamber can be varied from about −20° C. to about −40° C., (in general for freezing, the temperature in the freezer can range between about −15° C. to about −80° C. depending upon the product); the temperature of the gas on the inlet side of the spiral drum being lower than on the exit side. The product has a quilted pattern embossed into each side which presents a very irregular surface to the perforated plate and increases the density of the sandwich to enhance the freezing efficiency. The sandwich on exiting the invention has an equilibrated temperature of about −17° C. The fan supplying the air to the chamber inside the spiral drum generates a pressure under the perforated plate of about 3" water gauge; the spiral trough is about 106 mm wide and about 90 meters long consisting of 20 tiers. The perforated plate has about 1.5 mm dia perforations on about 9 mm centers. The circulating gas throughput is about 18000 cfm.

Design criteria of the apparatus will vary with the quantity, size, weight, density and configuration of the product to be treated. These design variable are: size and length of product conveying trough in the spiral; size and centers of perforations in the trough bottom; temperature, volume and pressure of air needed in the apparatus with appropriate fan size and pressure ability; type of gas circulated within the invention; total lineal length of the trough; pitch of the trough for conveying the product; volume of gas passing through the spiral drum; retention time in the trough; space available for locating the apparatus which dictates the configuration of the apparatus (for example, a straight trough or spiral) and whether a housing is part of the apparatus or is an existing freezing room. Other design changes may be considered in tailoring the apparatus to the product to be treated but it is emphasized that the basic principle of the invention does not vary. That is floating a solid or relatively impervious product on an air stream with the same air stream acting as the product treating medium while simultaneously providing a relatively friction-free conveying means; the product being moved along the trough by either gravity (as in a sloping trough in a spiral configuration) or by jets of the treatment gas inside the trough directed laterally onto the product in the direction of travel (or both). Said jets may be located either above, below or on the side of the product conveying trough. A diameter of about five feet for the spiral trough has been found satisfactory, but other sizes may be used or preferred in specific instances.

In another example of the use of the invention, the same apparatus used to freeze sandwiches is used to bake cookies. In this example cookie dough is rolled into a sheet. Cookies 60 mm in diameter are cut out of the sheet and fed into the spiral trough. The gas in the apparatus is air heated to about 130° C. The retention time in the apparatus is about 12 minutes and the baking rate is about 20,000 cookies per hour. An adjoining like apparatus is used to cool the cookies produced in the heating apparatus. The cooling being accomplished by pulling ambient atmospheric air through the fan pushing it through the spiral drum.

This invention also consists of a method, described as follows, for making specific food products which use the apparatus as a step in their manufacturing process:

1. Sandwich Manufacturing Method
A. Assemble two or more slices of bread with a filling between the slices.
B. Place the sandwich in the subject invention apparatus (which contains below freezing air) where it is frozen thereby bonding together the layers of bread and filling allowing the sandwich to be handled and packaged without falling apart.

2. Pastry Processing Methods
Method for proving a pastry product:
A. Mix the described ingredients of the pastry into a pliable dough.
B. Form into flattened pieces.
C. Place the pastry pieces into the subject invention which contains air or gas heated to the appropriate temperature for proving the pastry which is retained until proved.

Method for baking a pastry product while maintaining an identical pattern or surface texture on both sides:
  The pastry product ready for cooking is placed in the subject invention. The treating gas is heated to the appropriate temperature for baking the pastry which is retained until baked.

Method for freezing a pastry product:
  The pastry product ready for freezing is placed in the subject invention. The treating gas is cooled to the appropriate freezing temperature for freezing the pastry product which is retained until frozen.

3. Methods for Processing Formed Meat, Vegetable or Seafood Cakes
Method for cooking subject formed food cakes:
A. Form the food into cakes or shapes which offer the maximum practical surface area and best shape for floating on the air stream.
B. Apply a coating to the formed pieces if desired.
C. Place pieces to be cooked in the subject apparatus invention which contains air or gas heated to the desired temperature for cooking. Retain until cooked.

Method for cooling subject food cakes:
  Place pieces to be cooked in the subject apparatus invention which uses ambient or chilled air for cooling. Retain until cooled.

Method for freezing subject food cakes:

Place pieces to be frozen in the subject apparatus invention which contains air or gas at the desired below freezing temperature. Retain until frozen to desired temperature.

4. Method for Freezing Packaged Food Products
A. Fill packages such as sachets, small free flow containers of butter, jam or other such foods or slabs of wrapped foods such as butter, seafoods, vegetables or the like.
B. Place the packaged food to be frozen in the subject apparatus invention which contains air or gas at the desired below freezing temperature. Retain until frozen to desired temperature.

The subject invention is very useful in treating products by proving, heating, baking, drying, dehydrating, cooking, conveying, smoking, cooling, or freezing; when such products tend to stick to surfaces or distort until treated. The use of the invention is valuable in its ability to float any properly shaped product on an air stream while the product is being treated or processed; thereby avoiding contact with any hard surface until treated. It makes possible the preserving of a special texture or embossed pattern or coating on a product, an example is cookies which can be produced with an identical pattern and color on both sides rather than a pattern on one side and a flattened darker opposite side.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

What is claimed is:

1. A treating apparatus, comprising:
    a trough having an upper end and a lower end, said trough including;
        a perforated bottom through which a treating gas flows to support an item to be treated above the bottom of the trough, said perforation providing an open area through the bottom of the trough of between about 0.5% and about 20% of the bottom of the trough;
        sides to guide an item moving along the trough, and guide the treating gas about sides of the item;
        a top to guide treating gas over the top of the item;
        a treating gas exhaust opening for exhausting treating gas from the trough;
        a plenum chamber under the perforated bottom and communicating therewith;
        an inlet at one end of the trough for receiving items to be treated; and
        an outlet at the other end of the trough for discharging treated items after traveling along the trough from the inlet;
    means for supplying pressurized treating gas to the plenum; and
    means for causing items placed at the inlet of the trough to move along the trough to the outlet of the trough.

2. A treating apparatus according to claim 1, wherein the means for causing items to move along the trough is supporting structure for inclining the trough so items being treated and elevated above the bottom of the trough move along the trough by gravity.

3. A treating apparatus according to claim 2, wherein the trough forms several tiers one above the other and the plenum chamber includes a plenum chamber bottom wall, the plenum chamber bottom wall of one tier forming the trough top for the tier below.

4. A treating apparatus according to claim 1, wherein the perforations are substantially round and have a diameter of less than about 3 mm.

5. A treating apparatus according to claim 4, wherein the perforations are substantially round and have a diameter of between about 1.5 mm and about 2 mm.

6. A treating apparatus according to claim 4, wherein the perforations are spaced less than about 50 mm apart.

7. A treating apparatus according to claim 6, wherein the perforations are spaced between about 3 mm and about 25 mm apart.

8. A treating apparatus according to claim 6, wherein the trough is in the form of a spiral.

9. A treating apparatus according to claim 8, wherein the means for supplying treating gas to the plenum is a fan within a housing which creates a pressure chamber which communicates with the plenum chamber to supply treating gas thereto.

10. A treating apparatus according to claim 9, wherein the housing creating the pressure chamber is cylindrical and the spiral trough is secured to the housing.

11. A treating apparatus according to claim 10, wherein the housing forms a side of the trough.

12. A treating apparatus according to claim 11, wherein the side formed by the housing is perforated to allow air flow into the trough from the side.

13. A treating apparatus, comprising:
    a symmetrical housing having sides, a top, a bottom, and a housing central axis and forming a pressure chamber;
    a fan having a central air inlet and fan central axis positioned in the housing with the fan central axis substantially aligned with the housing central axis and expelling air radially into the housing;
    an air inlet extending from outside the housing to the fan inlet;
    an inclined trough secured to and extending from the sides of the housing and having an upper end and a lower end, said trough including:
        a perforated bottom through which a treating gas flows to support an item to be treated above the bottom of the trough so that it can move down the trough;
        sides to guide an item sliding down the trough, and guide the treating gas about sides of the item;
        a top to guide treating gas over the top of the item;
        a treating gas exhaust opening for exhausting treating gas from the trough;
        a plenum chamber under the perforated bottom and communicating therewith;
        an inlet at the upper end for receiving items to be treated; and
        an outlet at the lower end for discharging treated items after traveling down the trough; and
    interconnections between the pressure chamber formed by the housing and the plenum chamber to supply treating gas from the pressure chamber to the plenum chamber.

14. A treating apparatus according to claim 13, wherein the perforations are substantially round and have a diameter no greater than about 3 mm.

15. A treating apparatus according to claim 14, wherein the perforations are substantially round and have a diameter of between about 1.5 mm and about 2 mm.

16. A treating apparatus according to claim 14, wherein the perforation are round and have a diameter no greater than about 1.5 mm.

17. A treating apparatus according to claim 15, wherein the perforated bottom is formed of stainless steel of no greater than about 3 mm.

18. A treating apparatus according to claim 17, wherein the perforated bottom is formed of stainless steel of no greater than 1 mm.

19. A treating apparatus according to claim 13, wherein the approximate spacing between perforations is between about 3 mm and 50 mm.

20. A treating apparatus according to claim 19, wherein the approximate spacing between perforations is between about 3 mm and about 25 mm.

21. A treating apparatus according to claim 20, wherein the open area of the perforations make up between about 0.5% and 20% of the bottom of the trough.

22. A treating apparatus according to claim 13, wherein the open area of the perforations make up between about 0.5% and 20% of the bottom of the trough.

23. A treating apparatus according to claim 22, wherein the open area of the perforations make up between about 1% and 15% of the bottom of the trough.

24. A treating apparatus according to claim 23, wherein the open area of the perforations make up about 5% of the bottom of the trough.

25. A treating apparatus according to claim 13, wherein the speed of the fan is variable.

26. A treating apparatus according to claim 13, wherein the fan is connected directly to and rotated by a shaft of an electric motor mounted in the housing and having a shaft substantially aligned with the central axis of the housing.

27. A treating apparatus according to claim 26, wherein the speed of the motor is variable.

28. A treating apparatus according to claim 13, additionally including a drain in the bottom of the housing.

29. A treating apparatus according to claim 28, wherein the bottom slopes downwardly to the drain.

30. A treating apparatus according to claim 29, additionally including a source of washing fluid positioned in the air inlet adjacent the fan so that washing fluid can be injected through the source of washing fluid into the fan by which it is forced into the pressure chamber and through the plenum when desired to wash the apparatus.

31. A treating apparatus according to claim 30, additionally including a drain in the plenum chamber of the inclined trough.

32. A treating apparatus according to claim 13, wherein the housing includes a lower portion including the housing bottom, an upper portion including the housing top and the inclined trough secured to the housing sides, and the upper portion and lower portion are connected together by bolts, whereby removal of the bolts allows the upper portion to be separated from the lower portion for cleaning of the apparatus.

33. A treating apparatus according to claim 13, additionally including a source of cryogenic fluid in the air inlet for supplying cryogenic fluid to the air entering the treating apparatus.

34. A treating apparatus according to claim 13, additionally including an air distribution baffle positioned in the housing between the fan and the interconnections between the pressure chamber formed by the housing and the plenum chamber to more evenly distribute air from the housing to the plenum chamber.

35. A treating apparatus according to claim 34, wherein the air distribution baffle is a perforated cylinder.

36. A treating apparatus according to claim 13, additionally including a stop in the trough outlet to stop travel of items from the outlet.

37. A treating apparatus according to claim 36, additionally including a controller for the stop so that the stop is operated to control flow of items down the trough.

38. A treating apparatus according to claim 13, wherein the apparatus is adapted to treat cans of product, and wherein the trough is slightly wider than a can of product to be treated is long, whereby the can of product to be treated can roll down the inclined trough.

39. A treating apparatus according to claim 13, wherein the perforations in an inlet portion of the perforated trough bottom are different than the perforations in the remainder of the perforated trough bottom.

40. A treating apparatus according to claim 13, wherein the inlet extends from the housing top to the fan inlet.

41. A treating apparatus according to claim 13, wherein the trough top extends substantially parallel to the trough bottom.

* * * * *